March 19, 1946.   P. MONATH   2,396,924
SELF-STIRRING COOKING UTENSIL
Filed April 26, 1944   7 Sheets-Sheet 1
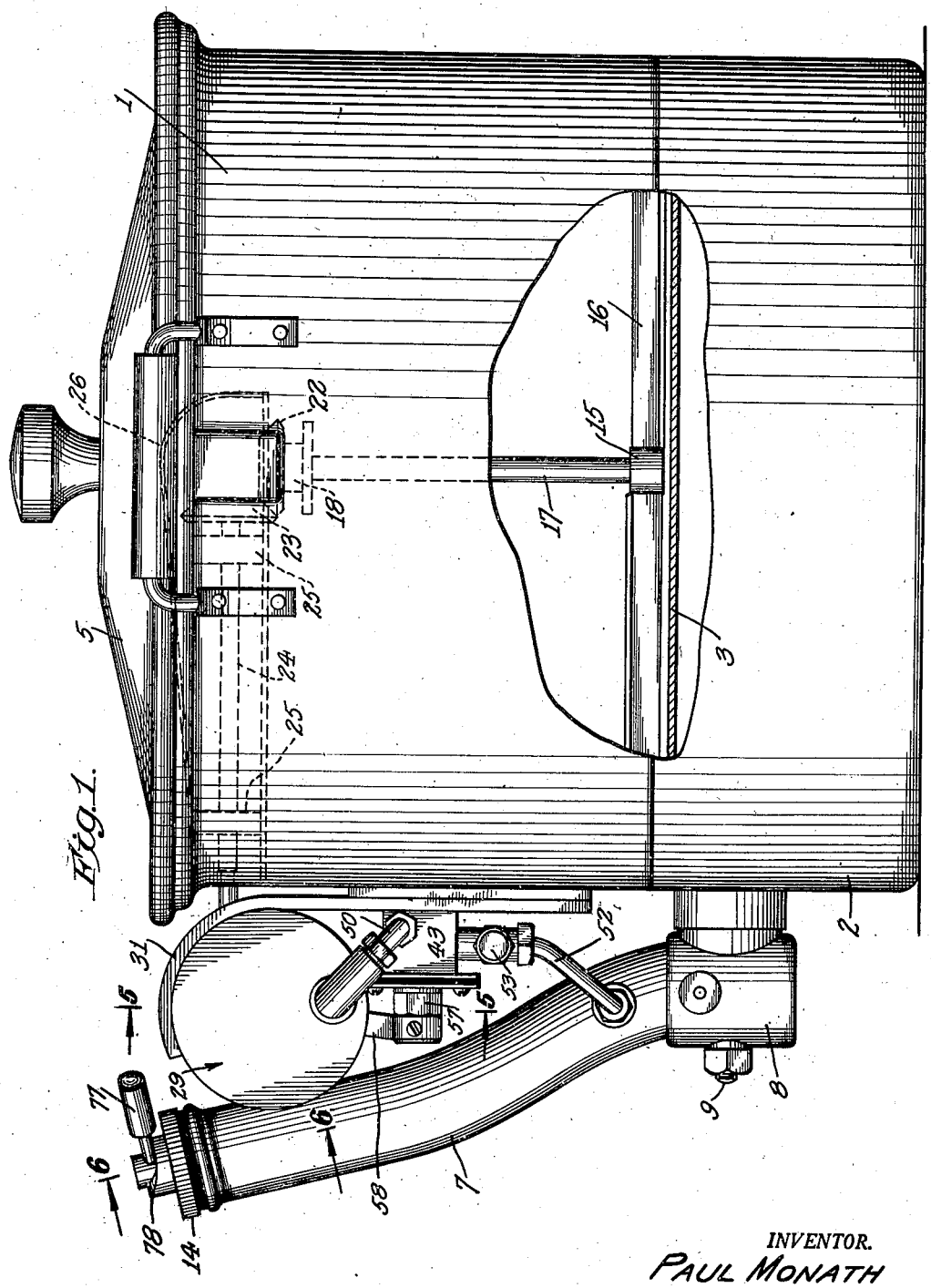
INVENTOR.
PAUL MONATH
BY
ATTORNEY

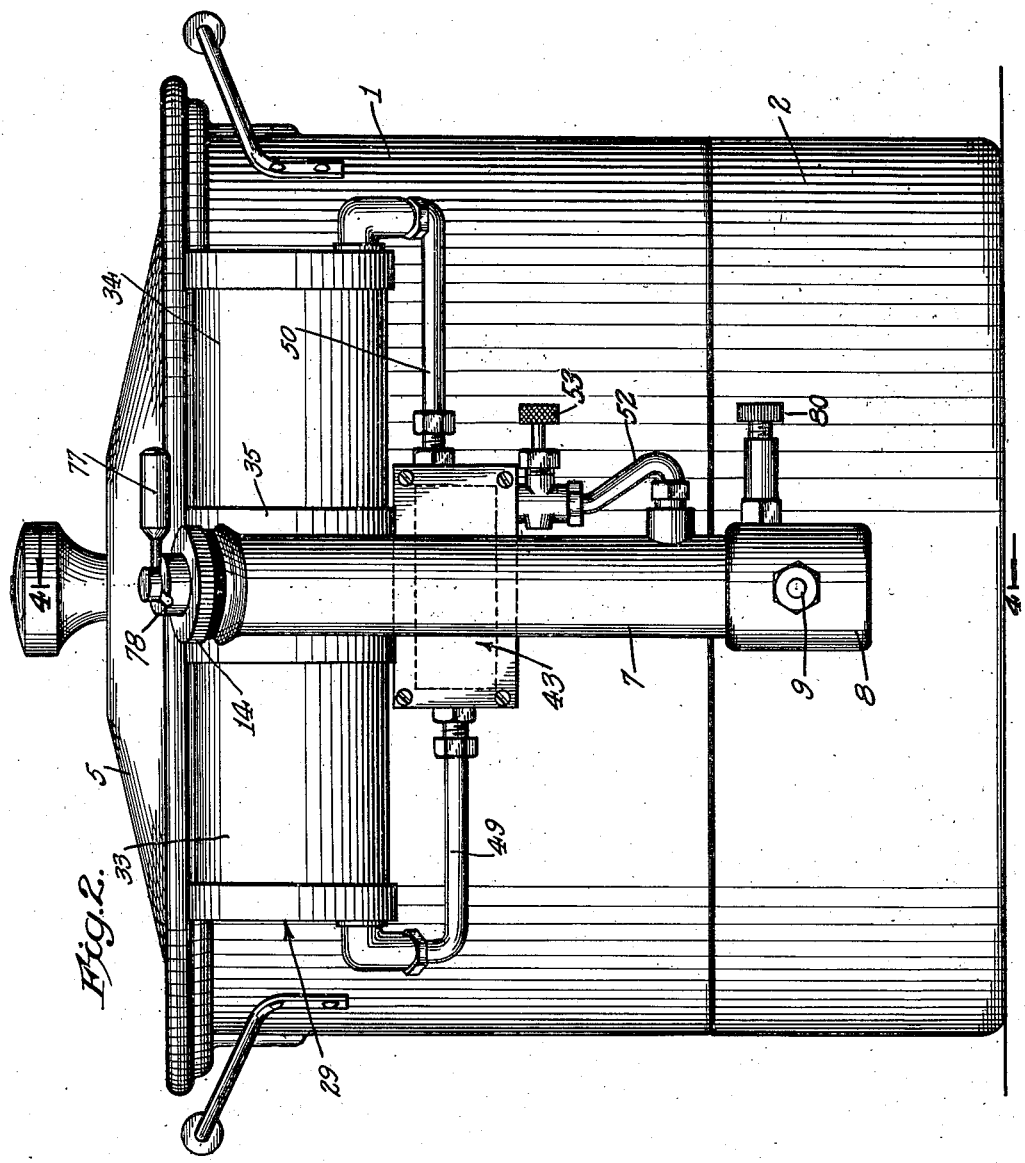

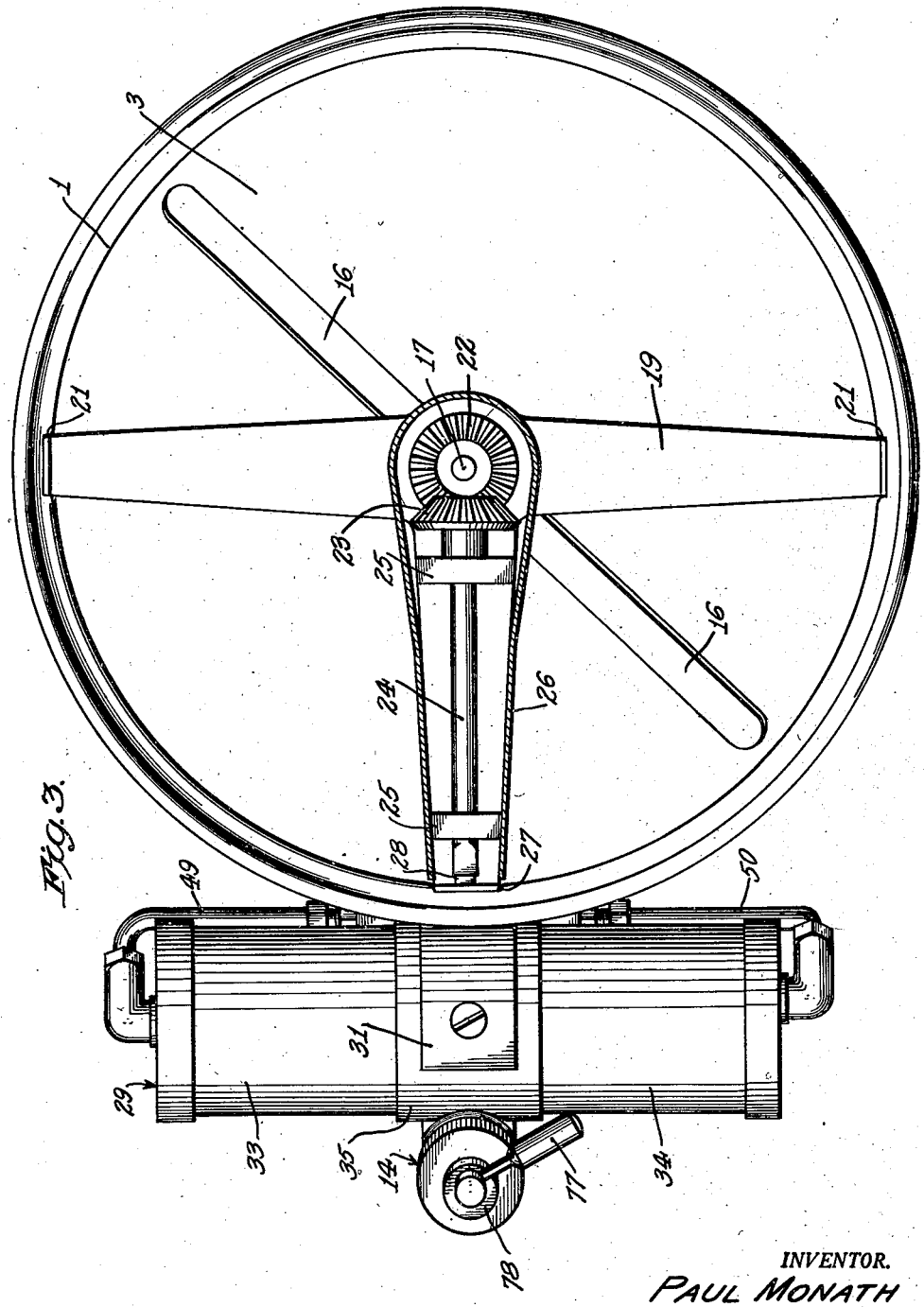

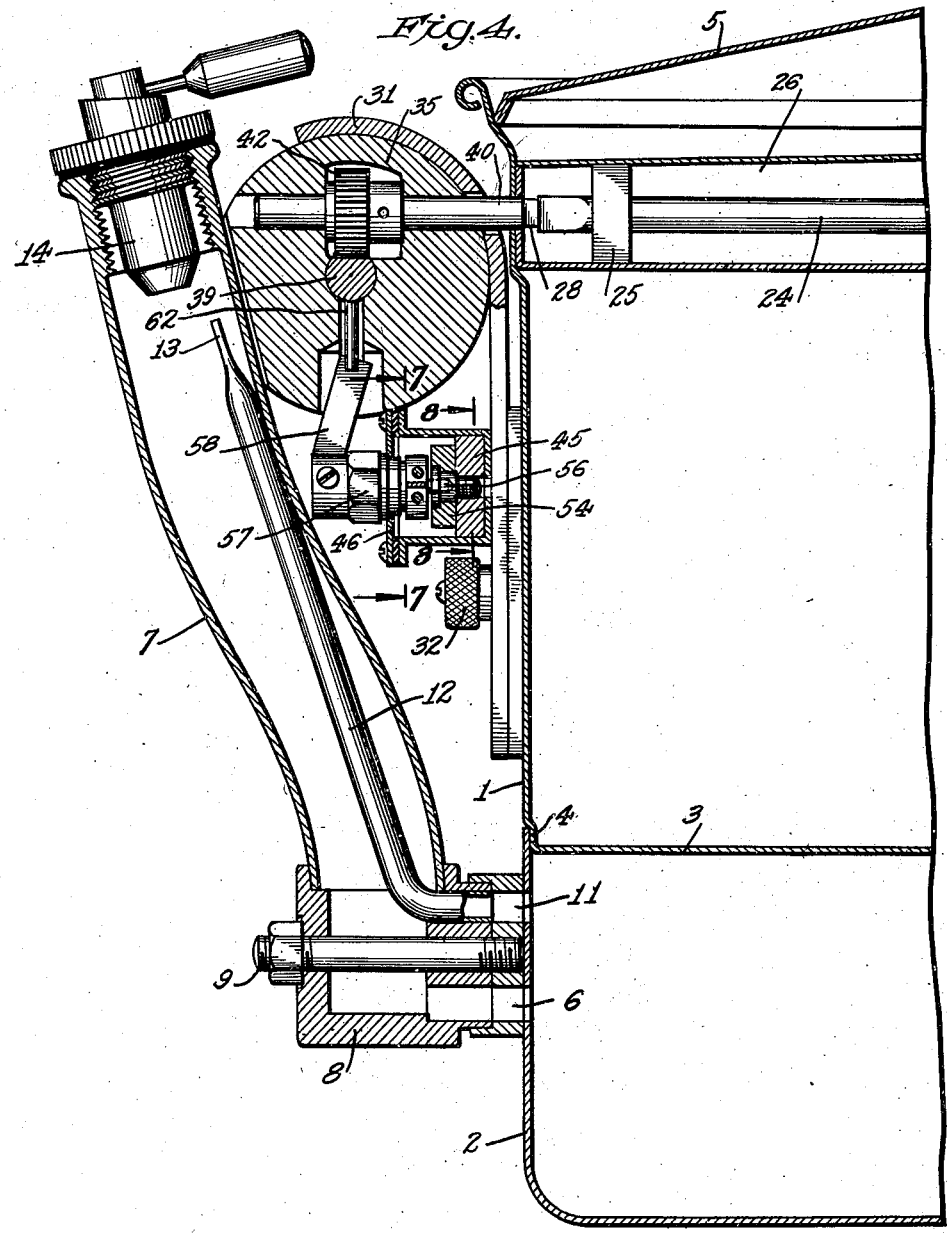

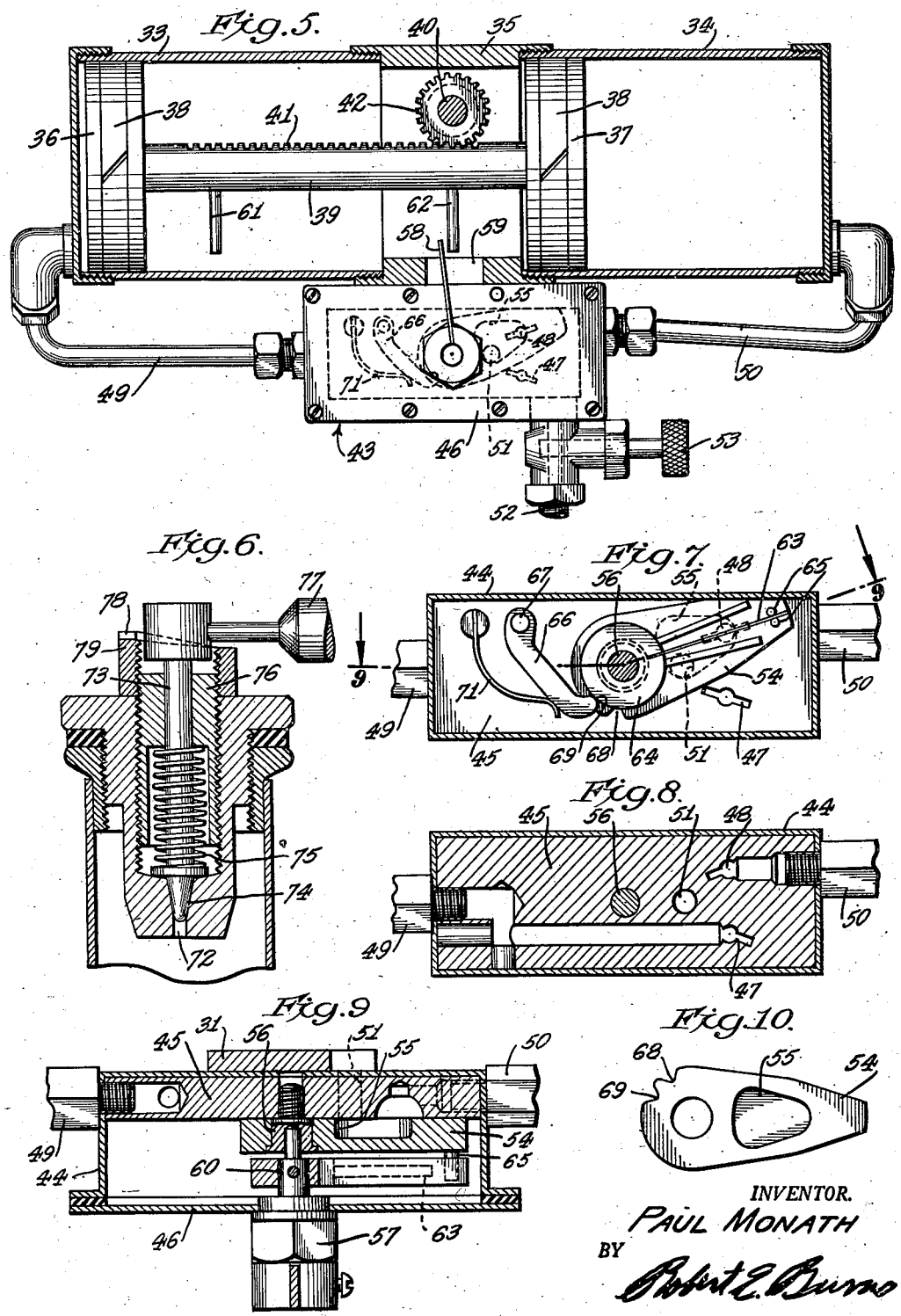

March 19, 1946. P. MONATH 2,396,924
SELF-STIRRING COOKING UTENSIL
Filed April 26, 1944 7 Sheets-Sheet 6
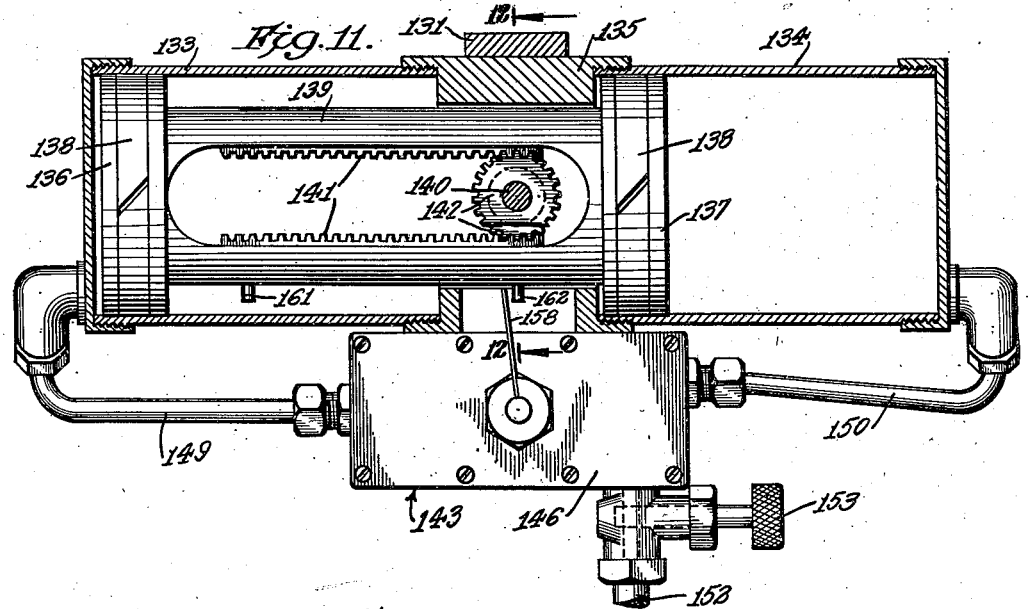
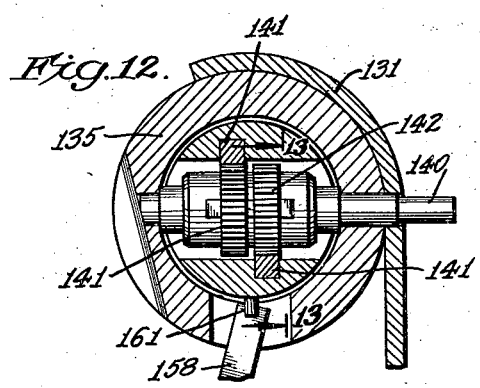
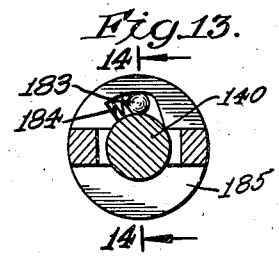
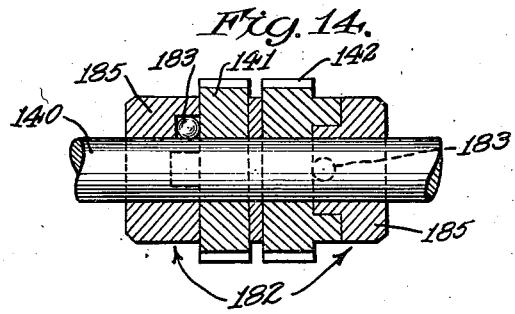
INVENTOR.
PAUL MONATH
BY
ATTORNEY

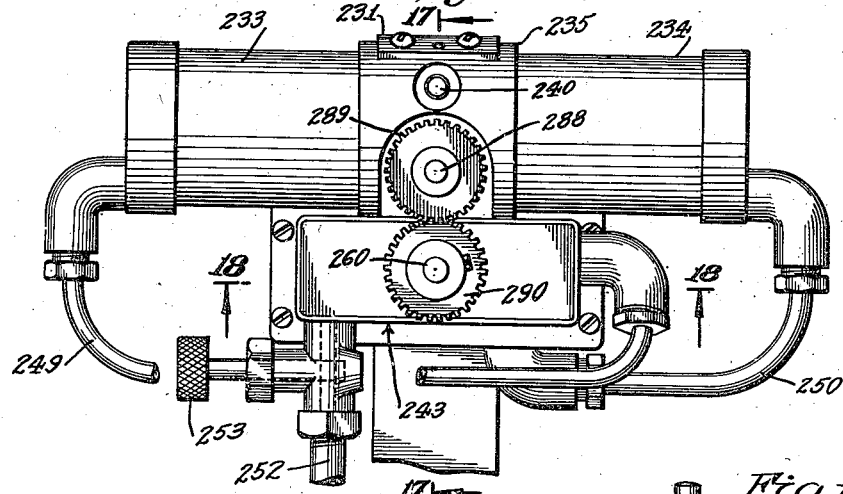
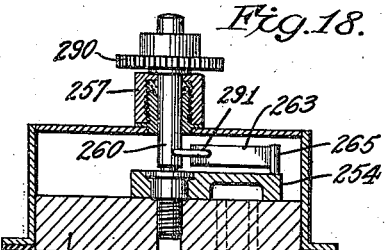
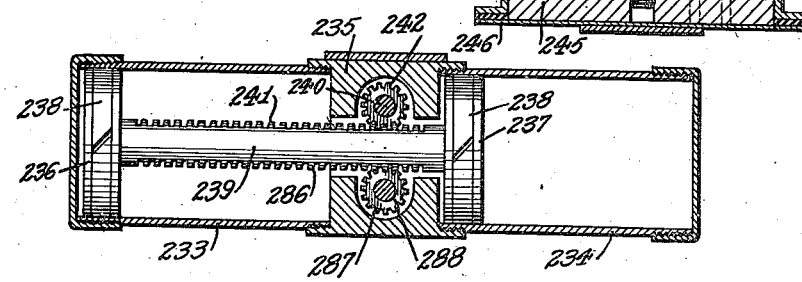
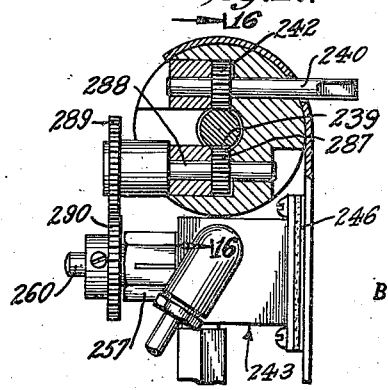

Patented Mar. 19, 1946

2,396,924

UNITED STATES PATENT OFFICE 2,396,924

SELF-STIRRING COOKING UTENSIL

Paul Monath, Hewlett, N. Y.

Application April 26, 1944, Serial No. 532,722

11 Claims. (Cl. 99—348)

My invention consists in the novel features hereinafter described, reference being had to the accompanying drawings which illustrate several embodiments of the same, selected by me for purposes of illustration, and the said invention is fully disclosed in the following description and claims.

The present invention relates to apparatus for simultaneously heating and stirring fluid or semi-fluid material, and in particular, to self-stirring cooking utensils.

In cooking fluid or semi-fluid material such as cereals, cream sauces, jellies, jams, glues, etc., it is frequently necessary to stir the material intermittently or continuously to prevent its becoming scorched or lumpy. In the usual household, hotel or restaurant, the stirring has heretofore been done by hand and has meant that the person preparing the material has had to stand by the stove for considerable periods of time to stir the material while it is cooking. It has been proposed to use electrically driven stirrers, but this requires an electric motor, wiring and controls. Moreover, it is not desirable to subject an electric motor to the heat and vapors incident to cooking or to have electric wires extend across the top of a stove to a cooking utensil located thereon. It has also been proposed to provide a cooking utensil with stirring mechanism driven by clockwork, but this requires the labor of periodically winding the spring of the clockwork mechanism, as such mechanism will, because of the power required for the stirrer, run only for a very limited period of time without rewinding.

It is an object of the present invention to provide a compact, self-contained unit for simultaneously heating and stirring fluent or semi-fluent material. In accordance with my invention embodied for example in a self-stirring cooking utensil, the material can be stirred continuously while being cooked over long periods of time without more than casual attention of an operator. This means that in the household the person doing the cooking is free for other duties or relaxation, while in a commercial establishment a single operator can be in charge of a plurality of such cookers and may still have time for other things.

Many preparations that require stirring while being cooked are easily scorched, and without the exercise of extreme care, scorching is liable to occur if the pan in which the preparation being cooked is put directly on the stove. It is a feature of my invention that this danger of scorching is avoided. In accordance with my invention, the heat of the stove or other heat source is not applied directly to the substance being cooked, but is applied rather to a steam generating chamber, which is separate from but in heat transferring relation to the cooking vessel. This steam chamber also supplies steam under pressure to steam operated driving mechanism for a stirrer or agitator in the receptacle for the material being cooked. The steam chamber thus serves the dual roll of applying modified and controllable heat to the cooking vessel and of supplying motive power for the stirring mechanism.

As distinguished from the usual double boiler in which the temperature applied to the upper compartment can be no greater than the temperature of boiling water, a feature of my invention is that the heat applied to the receptacle containing the substance being cooked is higher than the point at which water boils while still being sufficiently low to avoid scorching of the substance. This is achieved by holding the steam in the steam chamber under pressure whereby the temperature applied to the cooking vessel depends on the pressure and hence the temperature of the steam in the steam chamber. Means is provided for regulating the pressure in the steam chamber and thereby controlling the heat applied to the cooking vessel.

When a higher temperature is applied to the material being cooked, it will in general be desirable to stir the material more rapidly while with a lower temperature it may be preferable to stir the material more slowly. This result is automatically achieved by the apparatus in accordance with my invention, since the higher steam pressure necessary to obtain the higher cooking temperature will result in the steam operated stirring mechanism being driven more rapidly. In accordance with a preferred embodiment, means is provided for separately regulating the speed of the stirrer. A further feature of my invention is that in one embodiment thereof the stirrer is driven alternately in opposite directions to provide a reciprocating or oscillating stirring action for more effective agitation and mixing of the material.

Substances of a semi-fluid nature such as porridge, cream sauce or jam, usually have a rather critical water content. If water is added they become too thin, while if too much water is extracted they became too thick. In accordance with my invention, the automatic stirring is effected without disturbing the water content of the material being stirred. The cooking vessel is provided with a cover and this cover may be in place to close the vessel during cooking without in any way interfering with the automatic stirring action. Alternatively, the cover can be removed for inspection of the contents of the cooking vessel without interrupting the stirring. If desired the cover may be made steam tight so that the material can be cooked under pressure while simultaneously being stirred.

Other features, advantages and applications of my invention will be apparent from the following description of the embodiment shown by way of example in the accompanying drawings and from the appended claims.

In the drawings:

Fig. 1 is a side elevation of one embodiment of my invention, with a portion of the wall of the container broken away to show internal construction.

Fig. 2 is a rear elevation of the embodiment shown in Fig. 1.

Fig. 3 is a top plan view with the cover removed and with portions shown in section.

Fig. 4 is an enlarged scale, fragmentary, vertical sectional view taken approximately on the line 4—4 of Fig. 2.

Fig. 5 is an enlarged sectional view taken approximately on the line 5—5 in Fig. 1.

Fig. 6 is a sectional view taken approximately on the line 6—6 of Fig. 1.

Fig. 7 is a vertical sectional view of the valve mechanism taken approximately on the line 7—7 of Fig. 4.

Fig. 8 is a sectional view through the valve mechanism taken approximately on the line 8—8 of Fig. 4.

Fig. 9 is a horizontal sectional view of the valve mechanism taken approximately on the line 9—9 of Fig. 7.

Fig. 10 is a rear elevation of the valve element.

Fig. 11 is a vertical sectional view corresponding approximately to Fig. 5, but showing a modified form of driving mechanism.

Fig. 12 is a sectional view taken approximately on the line 12—12 of Fig. 11.

Fig. 13 is a fragmentary sectional view taken approximately on the line 13—13 of Fig. 12.

Fig. 14 is a sectional view taken approximately on the line 14—14 of Fig. 13.

Fig. 15 is an outside elevational view of a further embodiment of the driving mechanism and valve.

Fig. 16 is a vertical sectional view of the driving mechanism shown in Fig. 15 and taken approximately on the line 16—16 in Fig. 17.

Fig. 17 is an elevation, partially in section, taken on the line 17—17 in Fig. 15.

Fig. 18 is a fragmentary sectional view through the valve mechanism taken approximately on the line 18—18 in Fig. 15, certain parts of the mechanism being omitted for the sake of clearness.

In the embodiment of my invention shown by way of example in Figs. 1 to 10 of the drawings, a vessel or receptacle 1 for the material to be cooked is superimposed on a steam chamber 2. The steam chamber 2 and receptacle 1 are separate from one another in the sense that they do not communicate, and the receptacle may, if desired, be made removable from the steam chamber. However, in the embodiment shown in the drawings, a single container is divided by a common wall 3 into two compartments, the upper of which forms the cooking vessel and the lower the steam chamber. The dividing wall 3 and the joint 4 are both fluid tight so that the steam chamber is closed except for the passageways and openings hereinafter mentioned, and a fluid tight receptacle is provided for the liquid or semi-liquid material to be cooked. The cooking vessel 1 is provided with a cover 5, which may if desired be made steam tight so that the material in the vessel may be cooked under pressure.

The steam chamber 2 is provided with an opening 6 which communicates with an upwardly projecting filler pipe 7. The filler pipe is secured to the steam chamber by means of a fitting 8 held in place by a bolt and nut 9 which can be drawn up to provide a fluid tight joint between the fitting and the steam chamber. By unscrewing the bolt and nut the filler pipe 7 together with the fitting 8 can be removed. A second opening 11 in the steam chamber 2 communicates with a tube 12 which extends through the fitting 8 and up inside the filler pipe 7, being flattened at its upper end 13 to provide a restricted opening. The upper end of the filler pipe is threaded and is provided with a threaded fluid tight closure 14 which will be described in more detail below.

The cooking vessel 1 is provided with a stirring element or agitator 15, which is pivotally mounted for rotary or oscillating movement in the vessel. The stirrer or agitator may be of various forms, depending on the nature of the material being treated and a plurality of forms may be made interchangeable in order to handle different types of material in the same vessel. In the embodiment shown in the drawings, the stirrer comprises inclined blades 16 projecting outwardly from a central vertical shaft 17, the blades being preferably located near the bottom of the vessel and inclined in such manner that material is removed from the bottom and forced upwardly. The shaft 17 is rotatably supported by a bearing 18 carried by a bracket 19 which extends across the receptacle and fits snugly into slight recesses 21 formed in the side walls of the receptacle. Power for driving the stirrer is transmitted through a bevelled gear 22 at the upper end of vertical shaft 17, which engages a bevelled gear 23 on a transverse shaft 24, rotatably supported by bearings 25 in a housing 26, which extends from the bracket 19 to the side wall of the receptacle and further supports and steadies the stirrer. The outer end of the housing 26 fits into a recess 27 similar to recesses 21, while the outer end of the transverse shaft 24 is detachably connected by a coupling 28 with mechanism for driving the stirrer. Thus the stirrer assembly, including bracket 19, shaft 24 and housing 26 is readily removable as a unit from the receptacle merely by lifting the bracket 19 until clear of recesses 21 and then moving it upwardly and to the right, as viewed in Figs. 1 and 4, to disengage the shaft 24 from the driving mechanism and is replaceable in reverse manner. The ends of bracket 19 and housing 26 preferably fit snugly into the recesses 21 and 27, so that when in operative position, the stirrer unit is held by friction as well as gravity.

The driving mechanism for the stirrer is operated by steam and is mounted adjacent the cooking vessel, either inside or outside thereof. If the steam chamber and cooking vessel are made as separable units, the driving mechanism is preferably supported by the steam chamber so that the cooking vessel can be lifted off without disturbing the connections between the steam chamber and the driving mechanism. In the embodiment shown in the drawings, the driving mechanism indicated in general by the reference numeral 29, is carried by a bracket 31 removably secured to the side wall of the receptacle 1 by a stud bolt and nut 32, so that the entire driving mechanism can be dismounted as a unit.

The driving mechanism 29 comprises a cylinder and piston which are reciprocable relative to one another. In the embodiment illustrated in the drawings, the cylinder is held stationary while the piston reciprocates. As will be seen from Fig. 5 the cylinder assembly comprises opposed cylinder heads 33 and 34, connected by a central ring 35. Opposed piston heads 36 and 37 provided with piston rings 38 are reciprocable in cylinders 33 and 34 respectively and are connected by a rod 39. Gear teeth are cut on the connecting rod 39 to form a rack 41 which engages a pinion 42 on a shaft 40, rotatably supported by bearings in the center ring 35. The shaft 40 is connected by the aforementioned coupling 28 with the driving shaft 24 of the stirrer. It will be apparent that as the pistons reciprocate in the cylinders, engagement of rack 41 with pinion 42 will cause the pinion and hence the stirrer to rotate alternately in opposite directions, thereby providing an effective oscillating stirring action.

The driving mechanism is operated by steam supplied from the steam pressure chamber 2 through passageways automatically controlled by valve mechanism to admit steam alternately to the opposite cylinder heads 33, 34, to produce reciprocation of the pistons. The valve mechanism referred to generically by reference numeral 43 is mounted on the bracket 31 that supports the driving mechanism and comprises a steam chest 44 having a backplate 45 and a removable cover plate 46. The backplate forms a valve seat and is provided with spaced inlet ports 47, 48, connected respectively by inlet passageways 49, 50, with cylinders 33 and 34. The backplate is also provided with an exhaust port 51, which discharges either to the atmosphere or elsewhere, as desired. For example, the exhaust may be discharged into the cooking vessel if more moisture is desired in the contents thereof. The steam chest is also connected with the filler pipe 7 of steam chamber 2 by a passageway 52 provided with a throttle 53. As the filler pipe 7 extends upwardly from the steam chamber it is above the water line and acts as a steam dome, so that relatively dry steam is supplied to the steam chest 44.

The supply of steam from the steam chest to the cylinders is controlled by a valve element 54 which seats on the inner face of the backplate 45 of the steam chest and is held in contact with said plate by the pressure of the steam. The valve element 54 is provided on its inner face with a connecting passage or recess 55 and is swingable about a pivot post 56 from the position shown in Fig. 7 in which the recess 55 connects inlet port 48 with the exhaust port 51 to a position about 30° clockwise in which the inlet port 47 is connected with the exhaust port. It will be seen that when one inlet port is connected with the exhaust port the other inlet port is uncovered to admit steam under pressure from the steam chest, thereby supplying steam to the respective cylinders. Thus in the positions shown in Figs. 5 and 7, steam is admitted to cylinder 33 through passageway 49, while the cylinder 34 is connected with the exhaust port 51 through the passageway 50, the port 48 and the connecting passage 55 in valve member 54.

The shifting of valve element 54 from one position to the other is effected by the driving mechanism in synchronism with reciprocations of the pistons to supply steam to the respective cylinders at the proper time to produce reciprocation. In the embodiment shown in Figs. 1 to 10 (see particularly Figs. 5, 7, 8 and 9) a shaft 60, which is coaxial with pivot post 56 extends out through a steam tight gland 57 in the cover plate 46 of the steam chest and is provided at its outer end with a radially projecting member shown in the form of a resilient finger 58. The finger 58 extends up through an opening 59 in the central ring 35 connecting the two cylinder heads, and the upper end of the finger lies in the path of projecting pins 61, 62 carried by the rod 39 that connects the two pistons. It will be seen that as the pistons approach the end of their stroke to the left, as viewed in Fig. 5, the pin 62 engages finger 58 to rock the shaft 60 in a counterclockwise direction. When the pistons approach the end of their stroke towards the right, pin 61 engages finger 58 to rock the shaft 60 in a clockwise direction.

This oscillation of shaft 60 does not directly swing the valve member 54 from one position to another as the valve member is not fixed on the shaft, but is connected therewith through a resilient connection. In the embodiment shown by way of example in the drawings, the connection is in the form of a flat spring 63, which projects radially from a collar 64, fixed on shaft 60 inside the steam chest. The outer end of this spring is held between two pins 65 projecting from the valve element 54 near its outer end. It will be seen that the rocking of the shaft in either direction will transmit force through spring 63 tending to swing the valve member in the same direction. However, during the initial portion of the rocking movement of the shaft, the valve element is held against movement, and energy for swinging the valve element is stored in spring 63. The means for releasably holding the valve element in one or the other of its positions until the piston nears the end of its stroke is shown as a spring pressed pawl 66 which is pivoted at 67 and is adapted alternately to engage notches 68, 69 in the periphery of valve element 54. The shape and location of the notches and the pawl and the relative stiffness of spring 71 of the pawl and spring 63 are such that the valve element is held in one position until sufficient energy is stored in spring 63 to swing it all the way to the other position. Moreover as soon as the valve element is released from one position, the spring pressed pawl engages with the other notch and further tends to swing the element all the way to its other position. The valve element is thus swung from one position to the other by snap action, energy being stored in spring 63 during movement of the piston in one direction to swing the valve element to its other position near the end of the stroke, so as to control the steam passageways to produce movement in the reverse direction. Continued automatic operation of the mechanism is thus assured despite the fact that the mechanism does not have substantial inertia to carry it over from one stroke to the next.

It will be understood from the above description that the steam pressure chamber 2 not only modifies and controls the heat applied to the cooking vessel but also supplies motive power for the stirrer by furnishing steam for the driving mechanism 29. As the steam pressure in chamber 2 increases, a higher degree of heat is applied to the cooking vessel. Moreover with an increase in steam pressure the driving mechanism will run faster—other conditions being equal. This interrelationship is highly advantageous as it will generally be desirable for the contents of the vessel to be stirred faster the more rapidly they are cooked. Means for simultaneously regulating the rate of cooking and rate of stirring is shown in Fig. 6. The closure 14 for the upper end of filler pipe 7 is provided with a tapered aperture 72, a valve pin 73 having a tapered end 74 is pressed into aperture 72 by a coil spring 75. The upper end of spring 75 abuts a threaded strut 76 which can be screwed in or out of a correspondingly threaded recess in closure member 14 to adjust the tension of the spring. At the upper end of valve pin 73 there is provided a radially projecting handle 77, the shank of which is adapted to engage a cam surface 78 provided on the upper end of a collar 79, which is screwed onto the upper portion of strut 76. In the position shown in Fig. 6, the spring pressed plunger 73 completely closes the aperture 72. By turning the plunger by means of the handle 77, the shank of the handle is caused to ride up on the inclined cam surface 78, thereby opening the aperture 72 to varying degrees depending on how far the handle is turned. Thus the pressure in the steam chamber can be controlled by varying the opening of aperture 72 and thereby regulating the escape of steam from the chamber. The spring pressed plunger 73 also acts as a safety valve, since excessive pressure in the chamber will unseat the plunger against the action of spring 75, thereby permitting the escape of steam.

In addition to the dual control afforded by handle 77, making it possible to regulate both the cooking temperature and the rate of stirring simultaneously, the latter of which can be controlled by means of the throttle 53, by opening the throttle valve 53, the rate of stirring can be increased, while by decreasing the opening of the valve, the stirring mechanism can be made to run more slowly.

The operation of the cooking vessel will be understood from the above description. In using the vessel the material to be cooked is placed in the cooking receptacle 1 and water is supplied to the steam chamber 2 through the filler pipe 7. The proper water level in the steam chamber can be determined or controlled by a suitable gauge device shown in the drawings as a gauge valve 80, which can be opened to drain off excessive water and thereby establish the proper level. After closing the gauge valve 80 and the opening of the filler pipe, heat is applied to the vessel, as by placing it on a stove or turning on a heating element or burner to bring the water in the steam chamber to the boiling point. During this initial stage no stirring of the material contained in the cooking receptacle is necessary, as a cooking temperature has not yet been reached. However, as soon as steam pressure has been generated the steam will be admitted to the cylinders 33—34, to drive the stirring mechanism. The cooking temperature can be controlled either by controlling the heat applied to the vessel or by means of the regulating handle 77 as described above. The speed of operation of the stirrer can be controlled by the heat applied or by the adjustment of the handle 77, and also by means of the throttle valve 53. Considerable flexibility of control in the operation of the cooking vessel is thereby provided. Moreover, the expansion type, steam pressure operated motor and connecting gearing described above provides a low speed, high torque drive for the stirrer 15, as required, for example, in stirring viscous, semi-fluid materials such as porridge, cream sauce or jam.

A further embodiment of my invention is shown by way of example in Figs. 11 to 14, wherein corresponding parts are designated by the same reference numerals as in Figs. 1 to 10 with the addition of 100. In this embodiment the stirrer is rotated continuously in the same direction, instead of alternately in opposite directions. The continuous rotation of the stirrer is obtained by a different driving connection between the reciprocating pistons and the stirrer. The pistons 136, 137 are in this instance connected by a hollow or bifurcated connecting rod or member 139 carrying opposed rack sections 141. As will be seen from Figs. 11 and 12 these rack sections face inwardly and are offset laterally from one another. On the horizontal shaft 140 which transmits power to the stirrer there are provided two pinions 142, each of which engages one of the racks 141. These pinions are rotatable on the shaft 140 and each are connected therewith by a uni-directional clutch or ratchet 182 shown in the drawings as a ball 183 contained in a wedge-shaped recess 184 formed in the pinion or in a hub portion 185 connected therewith. When the pinion rotates in a counterclockwise direction as viewed in Fig. 13 the ball 183 will wedge against the shaft and cause the shaft to be rotated with the pinion. When the pinion is rotated in the opposite direction it will run free and not drive the shaft. The clutches 182 are so arranged that both of the pinions will drive the shaft in the same direction. It will be understood that as the pistons 136, 137 and the rack sections 141 reciprocate, the two pinions will be driven in opposite directions. Thus as the pistons move toward the right from the position shown in Fig. 11, the pinion engaging the lower rack will be rotated in a counterclockwise direction, while the pinion engaging the upper rack will be rotated in a clockwise direction. By reason of the uni-directional clutches or ratchets 182 the shaft will be driven alternately by the two pinions and will always be rotated in the same direction. The reciprocatory motion of the pistons is thereby translated into unidirectional rotary movement of the stirrer. Except for the different driving connections described above, the embodiment shown in Figs. 11 to 14 may be the same as that of Figs. 1 to 10.

In Figs. 15 to 18 I have shown a further modification of my invention in which corresponding parts are designated by the same reference numerals as in Figs. 1 to 10 with the addition of 200. In this embodiment of my invention the stirrer is driven through a pinion 242 which engages a rack 241 provided on the connecting rod 239, connecting the piston heads 236 and 237. The connecting rod 239 is provided with a second rack 286 which engages a pinion 287 on a rotatable shaft 288. At its outer end the shaft 288 is provided with a gear 289 which meshes with a similar gear 290 provided on the outer end of the shaft 260 of the valve mechanism 243 which controls the supply of steam to the driving cylinders 233, 234. The shaft 260 extends through a steam pipe gland 257 into the interior of the steam chest 244 and is provided with suitable bearing surfaces by which the shaft is rotatably supported. A valve element 254 which may be the same as the valve element 54 shown in Figs. 7, 9 and 10 is rotatably supported on the shaft 260 and is in sliding contact with the backplate 245 of the steam chest. Intermediate the valve element 254 and the cover plate 246 of the steam chest the shaft 260 is provided with a radially projecting arm or pin 291, which upon oscillation of the shaft 260 is adapted to engage the inner end of a leaf spring 263 which is fixed at its outer end to a pin or bracket 265 carried by the valve element 254.

It will be seen that as the pistons 236, 237 and the connecting rod 239 reciprocates, the shaft 260 of the valve mechanism will be rotated alternately in opposite directions, being driven through the rack 286, the pinion 287, shaft 288 and intermeshing gears 289, 290. The gear ratios are selected so that the reciprocatory movement of the pistons will produce an oscillation of shaft 260 of somewhat more than 360 degrees. As the pistons approach the end of their stroke in one direction, the pin 291 on the shaft 260 will engage the spring 263 carried by the valve element 254 and will deflect the spring to store up energy for shifting the valve element to a position for supplying steam to the cylinder to drive the pistons in the opposite direction. Upon rotation of the shaft 260 in the opposite direction, the pin 291 will engage the opposite side of leaf spring 263 to shift the valve element 254 back to its previous position. It will be understood that means may be provided for releasably holding the valve element in one or the other of its positions until the piston nears the end of its stroke, as in the embodiments previously described, and as shown for example in Fig. 7.

Except for the differences described above the embodiment of my invention shown in Figs. 15 to 18 may be substantially the same as that shown in Figs. 1 to 10. It will be understood moreover that the various forms of my invention illustrated in the drawings are shown solely by way of example, without in any way limiting the invention to the precise details shown, and that many alterations or modifications may be made within the scope of my invention as defined by the appended patent claims.

What I claim and desire to secure by Letters Patent is:

1. In a cooking utensil, the combination with a fluid-tight vessel, of a steam pressure chamber in heat transferring relation to but out of communication therewith, a stirring element in said vessel, opposed steam cylinders mounted adjacent said vessel, a piston head reciprocable in each of said cylinders, means connecting said piston heads with said stirring element and with each other, passageways connecting said cylinders with said steam pressure chamber, and valve means actuated by reciprocation of said piston heads to admit steam under pressure alternately to said cylinders to produce reciprocation of said piston heads and thereby actuate the stirring element.

2. In a household appliance, the combination with a fluid-tight receptacle, of a steam operating chamber in heat transferring relation to said receptacle but separate therefrom, an agitator pivotally supported in said receptacle, opposed steam cylinders mounted adjacent said receptacle, a piston head reciprocable in each of said cylinders, a rack extending between said piston heads, a pinion engaging said rack, power transmitting means connecting said pinion with the agitator, and valve controlled passageways for supplying steam from said chamber alternately to said cylinders to produce reciprocation of said piston heads and thereby actuate said agitator.

3. In combination with a fluid-tight receptacle, heating and stirring mechanism comprising a steam pressure chamber in heat transferring relation to said receptacle but separate therefrom, a stirring element pivotally supported in said receptacle, opposed steam cylinders mounted adjacent said receptacle, a piston head reciprocable in each of said cylinders, a rack extending between said piston heads, a pinion rotatably supported in engagement with said rack, means for transmitting power from said pinion to the stirring element, passageways connecting said cylinders with said steam chamber, and valve means actuated by reciprocation of said piston heads and rack for controlling the flow of steam to said cylinders to produce reciprocation of said piston heads and rack, and thereby driving the stirring element.

4. In combination with a fluid-tight receptacle, heating and stirring mechanism comprising a steam pressure chamber in heat transferring relation to said receptacle but separate therefrom, a stirring element pivotally supported in said receptacle, steam operated driving mechanism for said stirring element comprising a steam cylinder and piston reciprocable relative to one another, passageways connecting said driving mechanism with said steam pressure chamber, and snap acting valve means operated by the relative reciprocation of said piston and cylinder for controlling the flow of steam to said driving mechanism.

5. In combination with a fluid-tight receptacle, heating and stirring mechanism comprising a steam pressure chamber in heat transferring relation to said receptacle but separate therefrom, a stirring element pivotally supported in said receptacle, steam operated driving means for said stirring element comprising a steam cylinder and piston reciprocable relative to one another, passageways connecting said driving mechanism with said steam pressure chamber, a valve element for controlling the flow of steam to said driving mechanism, said valve element being shiftable to one position to supply steam for producing relative movement of said piston and cylinder in one direction, and to another position for movement in the opposite direction, means for storing energy during relative movement of said piston and cylinder in one direction to shift said valve element to its other position, and means for holding said valve element against such shifting until completion of movement in said direction.

6. In combination with a fluid-tight receptacle, heating and stirring mechanism comprising a steam pressure chamber in heat transferring relation to said receptacle but separate therefrom, a stirring element in said receptacle, driving mechanism for said stirring element comprising a steam cylinder and piston, reciprocable relative to one another, a steam chest mounted adjacent said driving mechanism, a passageway connecting said steam chest with said steam pressure chamber, a pair of inlet passageways leading from said steam chest to said driving mechanism, and an exhaust passageway, a valve element movable between two positions in each of which one of said inlet passages is connected with the exhaust passage while admitting steam to the other from said steam chest, resilient means acting on said valve element to urge it to one or the other of said positions, and a resilient connection between said valve element and said driving mechanism, cooperating with said first mentioned resilient means to move the valve element quickly from one to another of said positions in time with the relative reciprocation of said cylinder and piston.

7. Apparatus for simultaneously heating and agitating materials comprising a container, a fluid tight wall dividing said container into a lower compartment forming a steam pressure generating chamber, and an upper compartment forming a receptacle for said materials, a closure for said receptacle, an agitator for the materials in said receptacle, steam operated driving mechanism for said agitator mounted adjacent said receptacle, a filler pipe extending upwardly from said steam pressure chamber, a steam-tight closure for the upper end of said filler pipe, and a passageway connecting said filler pipe with said driving mechanism.

8. Apparatus for simultaneously heating and stirring materials, comprising a steam-pressure generating chamber, a receptacle for said materials superimposed on said chamber, a stirrer in said receptacle, steam operated driving mechanism for said stirrer, a filler pipe extending upwardly from said steam pressure chamber, a passageway connecting said filler pipe with said driving mechanism, a closure for the upper end of said filler pipe, said closure having an aperture, a spring pressed plunger having a tapered end normally closing said aperture, and means for adjustably lifting the plunger against the action of its spring to open said aperture varying amounts.

9. Apparatus for simultaneously heating and stirring materials, comprising a steam pressure generating chamber, a receptacle for said materials superimposed on said chamber in heat transferring relation therewith, a stirrer in said receptacle, steam operated driving mechanism for said stirrer, a passageway for supplying steam from said steam chamber to said driving mechanism, means for regulating the pressure in said steam chamber and thereby regulating the amount of heat applied to said receptacle, and means for separately regulating the speed of operation of said stirrer.

10. Apparatus for simultaneously heating and stirring viscous materials comprising a steam pressure chamber, a receptacle for said materials in heat transferring relation to but out of communication with said vessel, a stirrer in said receptacle, a steam operated motor for said stirrer, a passageway for supplying steam under pressure from said steam pressure chamber to said motor to operate said motor, and means including gearing connecting said motor with said stirrer to provide a low speed, high torque drive for said stirrer.

11. Apparatus for simultaneously heating and stirring materials comprising a steam chamber, a receptacle for said materials in heat transferring relation to but out of communication with said chamber, a stirrer in said receptacle, an expansion type motor, a passageway connecting said motor with said steam chamber, valve mechanism for controlling the admission of steam to said motor, and means including gearing connecting said motor with said stirrer to provide a low speed, high torque drive for said stirrer.

PAUL MONATH.